US 6,552,624 B2

(12) United States Patent
Fuerst et al.

(10) Patent No.: US 6,552,624 B2
(45) Date of Patent: Apr. 22, 2003

(54) METHOD FOR CONTROLLING THE OPERATING RANGE OF A MODULATOR, AND AN ASSOCIATED DRIVE UNIT

(75) Inventors: Cornelius Fuerst, Munich (DE); Harald Geiger, Neuried (DE); Georg Mohs, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/965,245

(22) Filed: Sep. 25, 2001

(65) Prior Publication Data

US 2002/0060614 A1 May 23, 2002

(30) Foreign Application Priority Data

Sep. 25, 2000 (DE) .......................................... 100 47 380

(51) Int. Cl.[7] ................................................. H03K 7/00
(52) U.S. Cl. ........................ 332/106; 332/109; 332/112
(58) Field of Search .............................. 332/106, 109, 332/112, 115, 117, 107

(56) References Cited

U.S. PATENT DOCUMENTS

| 4,278,992 | A | * | 7/1981 | Christopher | 358/13 |
| 5,465,270 | A | * | 11/1995 | Beauducel et al. | 375/242 |
| 5,592,131 | A | * | 1/1997 | Labreche et al. | 332/103 |
| 5,984,881 | A | * | 11/1999 | Ishibashi et al. | 601/2 |
| 6,356,375 | B1 | * | 3/2002 | Holcombe | 359/189 |

* cited by examiner

Primary Examiner—Brian Young
Assistant Examiner—John B Nguyen
(74) Attorney, Agent, or Firm—Bell, Boyd & Lloyd LLC

(57) ABSTRACT

Method for controlling the operating range of a modulator, and an associated drive unit, the operating range of the modulator being controlled via a control circuit such that the operating range is stable over a long period of time and in different operating conditions, relative to the transmission characteristic of the modulator.

19 Claims, 7 Drawing Sheets

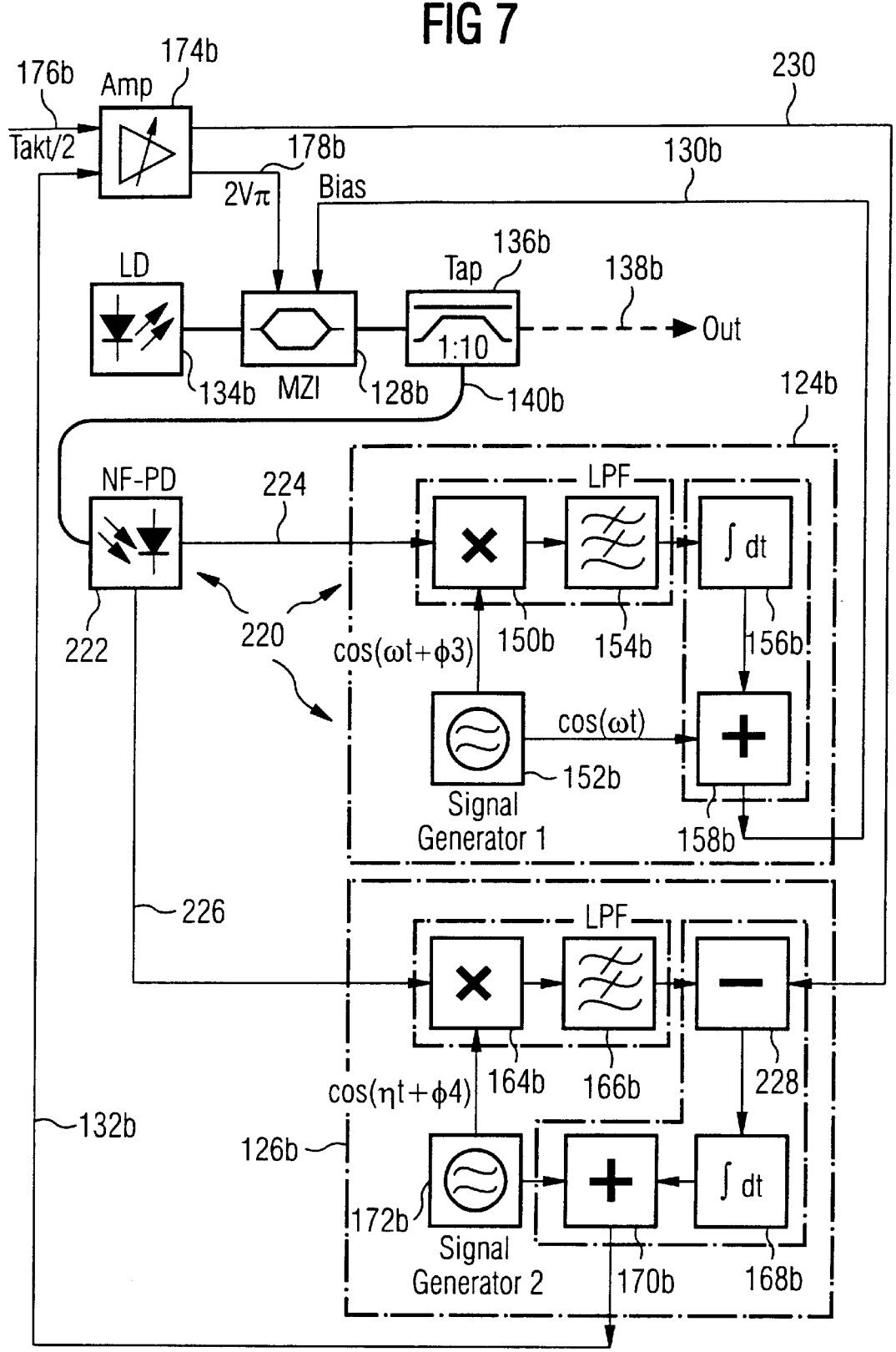

METHOD FOR CONTROLLING THE OPERATING RANGE OF A MODULATOR, AND AN ASSOCIATED DRIVE UNIT

BACKGROUND OF THE INVENTION

The present invention relates to a method for controlling the operating range of a pulse modulator. The modulator produces modulated output radiation, for example, in the optical range, from input radiation as a function of a control signal.

Stable pulse sources are required to produce pulses in optical message transmission networks. One simple and cost-effective method for producing pulses from a continuous-wave source via high-speed optical modulators is described in DE 199 24 347.6. However, the long term stability of the pulse source is problematic in this method. In order to avoid operating range changes, inherently stable modulators have, until now, been used for low data rates, in which the long term stability is achieved by complex design measures. The same problems also occur in data modulators.

One object of the invention is, therefore, to provide a simple method for controlling the operating range of a modulator, which ensures that the operating range of the modulator is fixed. Furthermore, an associated drive unit is intended to be specified.

SUMMARY OF THE INVENTION

The present invention is based on the knowledge that the operating range of the modulator close to the operating point is a major operating parameter. The operating range varies for various reasons, for example, as a function of the operating temperature, or due to aging of the modulator. Furthermore, the operating range is subject to scatter due to production tolerances between different modulators.

Preferably, according to the present invention, the modulator produces modulated output radiation from input radiation as a function of a control signal. The actual operating range of the modulator with respect to its transmission characteristic depends on the amplitude of the control signal. Starting from the output radiation, the mean radiation power is detected in at least one predetermined frequency range. The mean radiation power is the radiation power averaged over the frequencies. Cyclic deflection of the operating range is forced to occur at the deflection frequency. A control signal for controlling the operating range is produced as a function of the deflection of the operating range. The amplitude of the control signal is varied as a function of the control signal, so that the discrepancy between the actual operating range and the nominal operating range becomes less.

The operating range can be controlled very accurately and in a simple manner by detecting the radiation power and using the power as a control variable. Changes to the transmission characteristic can also be included in the control system, by indirect reference to the transmission characteristic. This procedure allows the control process to be carried out even without presetting any nominal power.

In one embodiment, the derivative of the function of the operating range and detected power is used as a control variable. The control process refers to a point in the function at which the derivative has the value zero. A minimum, a maximum, a point of inflection or some other point at which a derivative has the value zero in the power curve is chosen, by way of example, as the reference point. Thus, using the reference point, the control loop controls to this point without any additional tuning.

Known method of control engineering (e.g., analog or digital control methods based on the use of proportional, integral and differential regulators, and combinations of them) can be used for control. However, very good control loops result if the control variable is detected using phase-sensitive detection, which is also known as the lock-in method. Phase-sensitive detection has the advantage that the control process can be carried out comparatively independently of disturbance variables (e.g., signal noise). Phase-sensitive detection is further explained in the book "Electronic Measurement and Instrumentation", Klaas B. Klaassen, Cambridge University Press, 1996, pages 204 to 210.

Preferably, the modulator is either a pulse modulator, which is driven at a drive frequency predetermined by a cyclic control signal, or a data modulator, which is driven by a control signal dependent on the data to be transmitted, with half the data rate being referred to as the drive frequency.

In one embodiment of the present invention, the frequency range, which is predetermined for controlling the operating range, includes all the output radiation frequencies which can be detected by a transducer unit. There is no need for any filters for selecting a frequency range.

In yet another embodiment, the frequency range, which is predetermined for controlling the operating range, includes only a portion of the output radiation frequencies detected by a transducer unit. Although this necessitates filter units being connected downstream from the transducer unit, it creates additional degrees of freedom in the choice of the control variable.

In one embodiment, in which only some of the frequencies detected by the transducer unit are used, the predetermined frequency range includes twice the drive frequency. The predetermined frequency range does not include other multiples of the drive frequency and the drive frequency itself. Thus, if there are any discrepancies in the actual operating range and the nominal operating range, the radiation power in the vicinity of twice the drive frequency falls considerably, so that the power in this region is highly suitable for control purposes. The frequency range used has a width of 0.3 times twice the drive frequency, in one embodiment.

In embodiments with predetermined frequency ranges in the radio-frequency band, and a nominal operating range of the modulator which is symmetrical about a transmission maximum (Return to Zero (RZ) operation), or which is about a transmission minimum (carrier-suppressed RZ operation), the amplitude value of the control signal is controlled via a control loop. Without being tuned, the control loop is aligned with a control point at which the mean radiation power is maximized within the frequency range predetermined for controlling the operating range.

In yet another embodiment, the frequency range, which is predetermined for controlling the operating range, includes only frequencies which are well below the drive frequency (i.e., the frequency is low in comparison to the drive frequency). For example, these frequencies are less than one-tenth of the drive frequency. Thus, components with low-cut-off frequencies may be used, even if the drive frequency is in the radio-frequency band.

If, in one embodiment, the nominal operating range of the modulator, preferably of a pulse modulator, in the low-frequency range is symmetrical about a transmission minimum (carrier-suppressed RZ operation) or is symmetrical about an operating point between a transmission point of inflection and a transmission maximum (clock RZ operation), then the amplitude value of the control signal is controlled via a control loop which is aligned, without tuning, to a control point at which the mean radiation power is a maximum within the frequency range predetermined for controlling the operating range.

If, in another embodiment, the nominal operating range of the modulator, preferably of a pulse modulator, in the low-frequency band is, in contrast, symmetrical about a transmission maximum (RZ operation) or is symmetrical about an operating point between a transmission minimum and a transmission point of inflection (clock RZ operation), then the amplitude value of the control signal is controlled via a control loop which is aligned, without tuning, to a control point at which the mean radiation power is a minimum within the frequency range predetermined for controlling the operating range.

The control loops for controlling the operating range are tuned, in other embodiments, meaning the control loop is controlled to a point close to the control point, in the nominal operating range of the modulator. The control loop can be tuned by known methods of control engineering (e.g., by deliberately applying a disturbance variable).

The amplitude value of the control signal can, for example, easily be varied by adjusting the gain of an amplifier at whose output the control signal is produced. A clock signal (e.g., a sinusoidal or square-wave signal) or a data signal is applied to the input of the amplifier.

A control variable with the correct mathematical sign can easily be obtained if a small discrepancy is forced to occur between the operating range and the nominal operating range, for control purposes. The power is detected for at least two operating ranges.

The control variable with the correct mathematical sign is then derived from the detected power. One method which operates with forced discrepancies in the operating range is phase-sensitive detection. Phase-sensitive detection is also referred to as the lock-in method, see Klaas B. Klaassen, "Electronic Measurement and Instrumentation" Cambridge University Press, 1996, pages 204 to 210.

In one embodiment, the discrepancy in the operating range is forced via a periodic deflection signal at a predetermined deflection frequency. The deflection signal is additively or subtractively superimposed on the control signal. A signal which is dependent on the detected power is multiplied by a cyclic reference signal, whose frequency matches the deflection frequency. A signal resulting from the multiplication is used, after low-pass filtering and preferably after subsequent integration, for varying the amplitude of the control signal. The cut-off frequency of the low-pass filter governs the response time of the control loop which is, for example, between 10 and 100 milliseconds. The refinement is based on the knowledge that the signal value of the DC component that passes through the low-pass filter is a measure of the first derivative of the power function.

The deflection signal has a cosine or sinusoidal waveform. However, other deflection signals (e.g., a square waveform) are also used. If the reference signal frequency corresponds to a multiple of the deflection frequency, then it is possible to detect points at which higher derivatives are zero, for instance, a point of inflection at twice the deflection frequency.

The operating point can be controlled in a similar way at the same time. The deflection frequency for controlling the operating point and the deflection frequency for controlling the operating range are chosen appropriately. Deflection frequencies that differ from one another are thus used, for example a deflection frequency of 3 kHz and a deflection frequency of 5 kHz.

In a pulse modulator or a data modulator, the input radiation is produced via a continuous wave light source or via a pulsed light source.

In further embodiments, the drive frequency and the data rate are more than 1 Gigahertz or 1 GBit/s, respectively, preferably 5 Gigahertz and 5 GBit/s, respectively. In yet another embodiment, the modulator operates in the optical band. A modulator which contains a Mach-Zehnder interferometer is suitable. The modulator's transmission characteristic is, for example, in cosine form, or sinusoidal. However, modulators with other transmission characteristics are also used.

The present invention also relates to a drive unit for carrying out the methods mentioned above. The technical effects cited for the method also apply to the drive unit and to its embodiments.

Additional features and advantages of the present invention are described in, and will be apparent from, the following Detailed Description of the Invention and the Figures.

BRIEF DESCRIPTION OF THE FIGURES

FIG. 7 shows a block diagram of an exemplary embodiment of a drive unit operating at low frequency in accordance with the principles of the present invention.

DETAILED DESCRIPTION OF THE INVENTION

Figure 1:
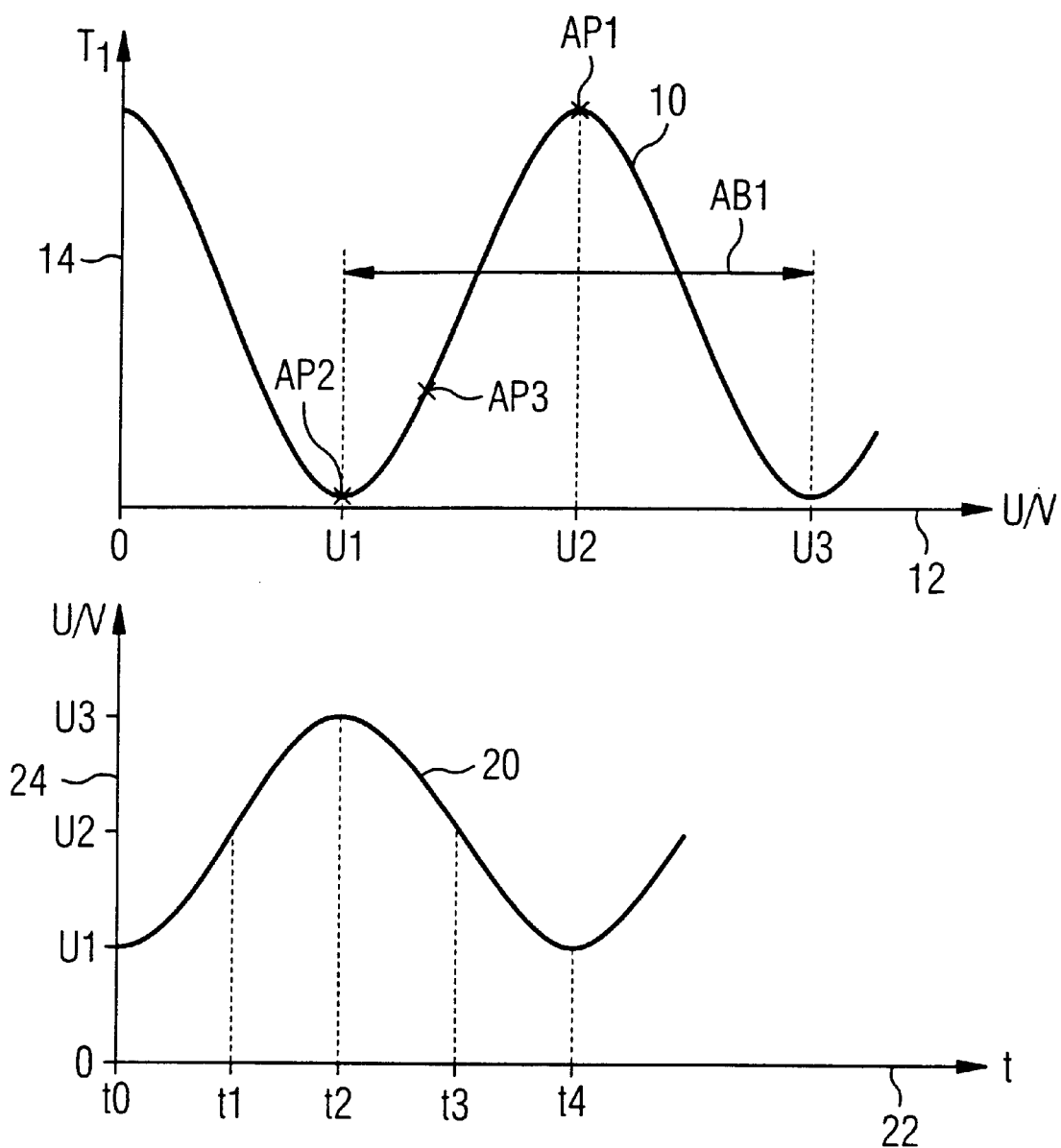
FIG. 1 shows a transmission characteristic of a pulse modulator and the waveform of a control signal.

The upper part of FIG. 1 shows a transmission characteristic 10 of a pulse modulator. The drive voltage is plotted in volts on an abscissa axis 12. Transmission values T are shown on an ordinate axis 14. The transmission characteristic 10 has a cosine waveform starting at a voltage of 0 volts. The transmission falls from a maximum value of 1 to virtually 0 at a voltage U1. The voltage U1 has an associated operating point AP located at a transmission minimum. As the voltage increases, the transmission T rises once again until, at a voltage U2, an operating point AP1 is reached which is located at a maximum on the transmission characteristic 10. If the voltage is increased further, then the transmission falls, and reaches a minimum once again at a voltage U3.

The operating point AP1 at the transmission maximum is also referred to as an RZ operating point (Return to Zero).

In RZ operation, the operating point AP1 should always be located at the transmission maximum. If the transmission characteristic 10 of the pulse modulator varies, then the operating point AP1 must be readjusted by varying the voltage U2. As the age of the pulse modulator increases, the transmission characteristic 10 will be compressed or stretched in the direction of the abscissa axis 12, and/or in the direction of the ordinate axis 14. Furthermore, the transmission characteristic may be shifted with respect to the abscissa axis. If the pulse modulator is operated at the operating point AP1, then there is an optimum operating range AB1 precisely between the voltages U1 and U3.

However, the modulator may also be operated at the operating point AP2, at which the drive voltage fluctuates about the voltage U1. This method of operation is referred to as suppressed-carrier operation. The optimum operating range at the operating point AP2 is between the voltage 0 volts and the voltage U2.

However, the pulse modulator may also be operated at an operating point AP3 which is located between the two operating points AP1 and AP2. In an exemplary embodiment, the operating point AP3 is located below the point of inflection of the transmission characteristic 10 in the vicinity of the operating point AP2. The optimum operating range for the operating point AP3 is symmetrical about this operating point AP3 between the voltage U1 and a voltage that is less than the voltage U2.

The lower part of FIG. 1 shows the voltage waveform of a control signal 20 as a function of time t, plotted on an abscissa axis 22. An ordinate axis 24 is used to show the voltage values U in volts.

The control signal 20 is used to drive the pulse modulator at the operating point AP1. At a time t0, the control signal 20 is at the voltage U1, so that the modulator passes only minimal output radiation. At a later time t1, the control signal voltage is U2. Thus, the modulator passes the input radiation virtually unimpeded. A light pulse appears at the output of the modulator. At a time t2, the control signal voltage is U3, so that the modulator is once again operating at a transmission minimum, and is essentially not passing any light. At a time t3, the control signal voltage is once again U2, so that a second light pulse is produced. At a later time t4, the control signal 20 once again has the voltage value U1, so that no radiation reaches the output of the modulator. Two light pulses are thus emitted during one cycle of the control signal 20.

The mean value of the sinusoidal control signal 20 governs the operating point, see the voltage U2. The amplitude of the control signal 20 governs the operating range AB1, see the difference between the voltages U3 and U1.

Figure 2:
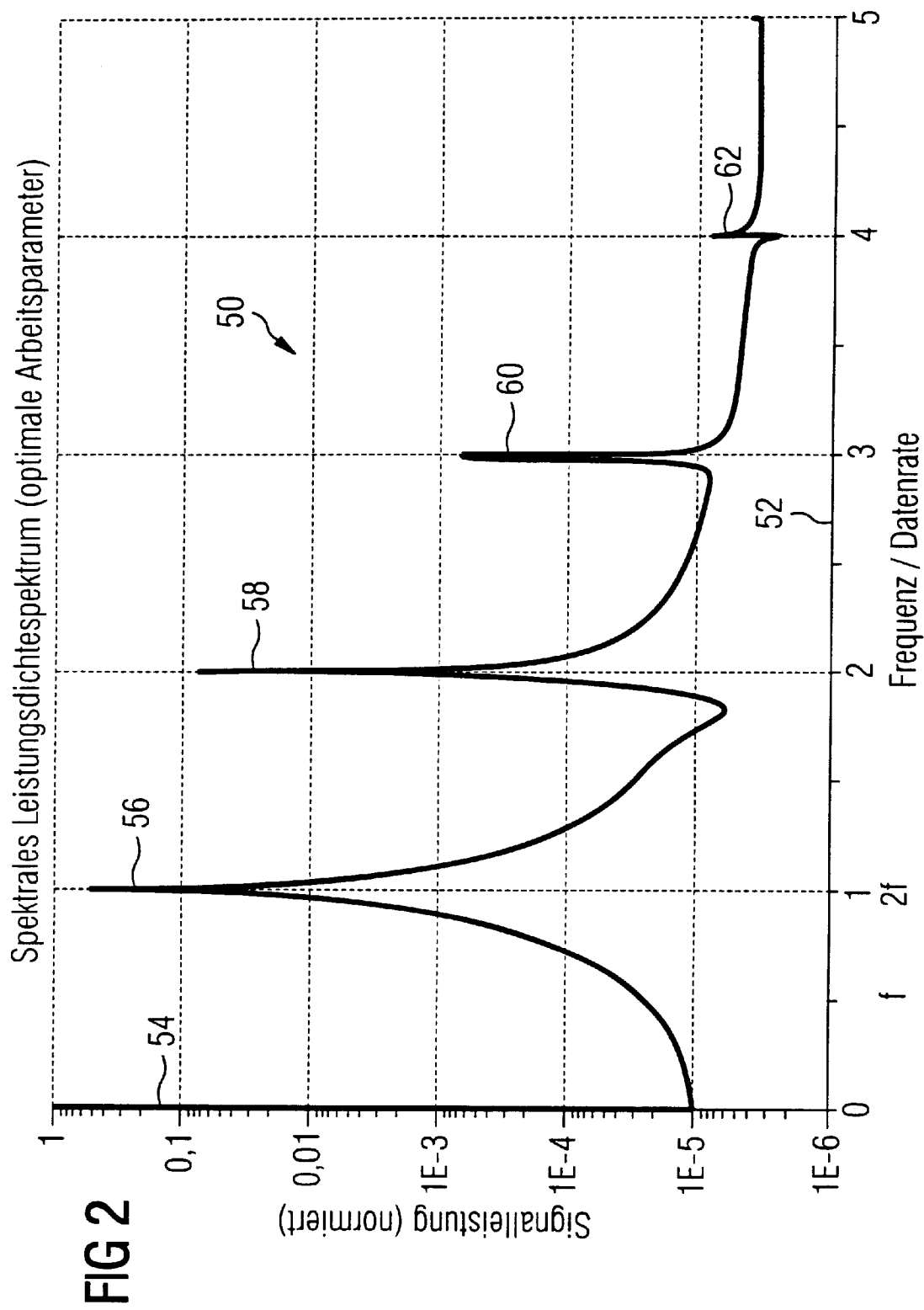
FIG. 2 shows the spectral power density spectrum of the output radiation from the pulse modulator with optimum operating parameters.

FIG. 2 shows the power density spectrum 50 of the output radiation from the pulse modulator at the optimum operating point AP1 and in the optimum operating range AB1, see the upper part of FIG. 1. The frequency is plotted with respect to the data rate on the abscissa axis 52. In an exemplary embodiment, the data rate is 10 Gigabits per second, and the control signal drive frequency is 5 Gigabits per second. The signal power, as detected via a photodiode and via a spectrum analyzer, is plotted on a logarithmic scale on the ordinate axis 54. The signal power has been normalized.

The power density spectrum 50 has four power peaks 56, 58, 60, 62 at the frequency/data rate values 1, 2, 3 and 4. The peak values of the power peaks 56, 58, 60 and 62 are, in this sequence, at approximately 0.6; 0.08; 0.0007 and $8 \times 10^{-6}$.

Figure 3:
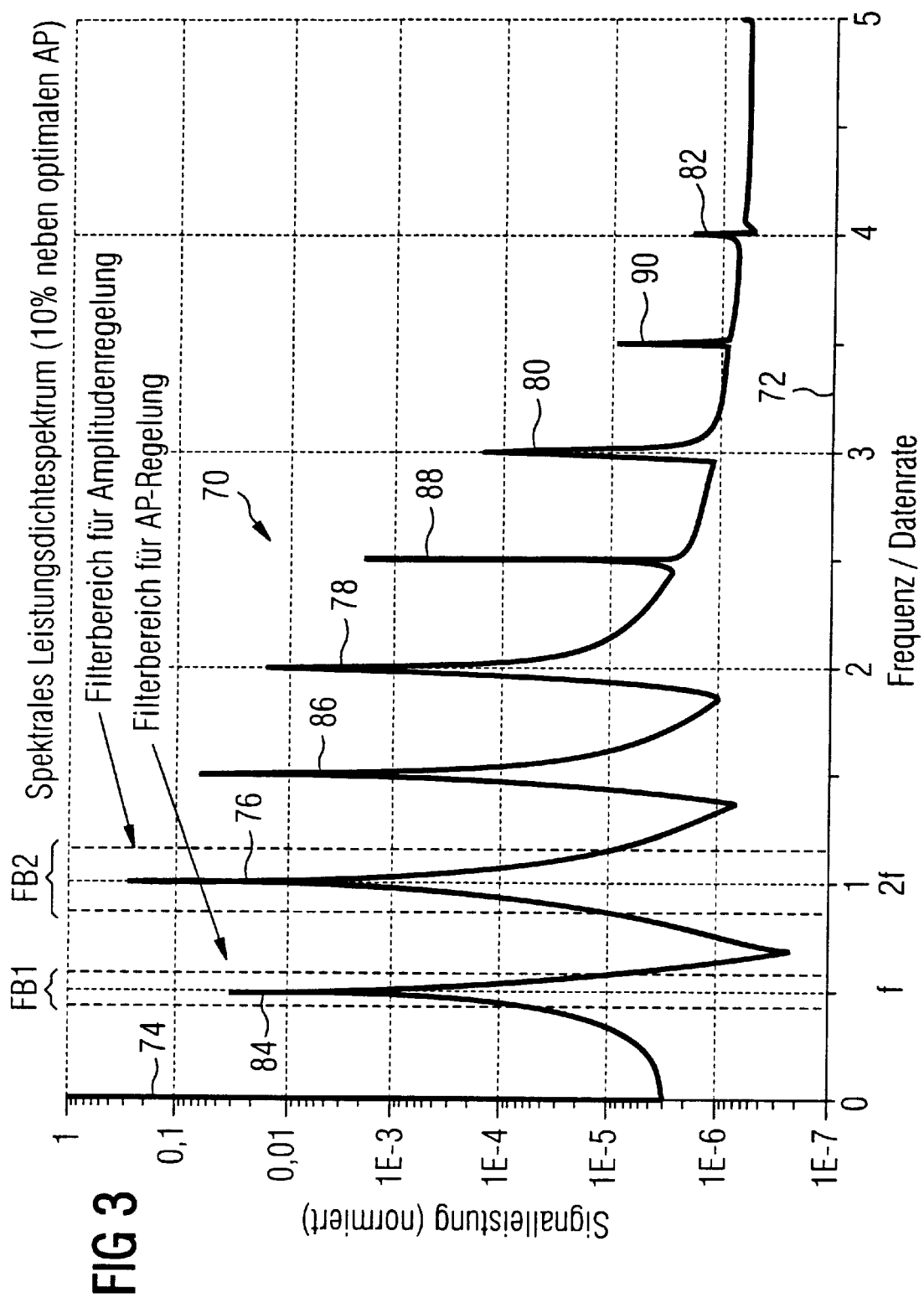
FIG. 3 shows the spectral power density spectrum of the output radiation when there is a 10 percent discrepancy between the actual operating point and the nominal operating range.

FIG. 3 shows the power density spectrum 70 of the output radiation from the pulse modulator when there is a 10 percent discrepancy between the actual operating point and the nominal operating point AP1. The operating range AB is shifted in a corresponding manner, but its width is not changed. As with the abscissa axis 52 in FIG. 2, an abscissa axis 72 shows the ratio of the frequency to the data rate. An ordinate axis 74 shows the normalized radiation power on a logarithmic scale. Power peaks 76, 78, 80, 82 occur in this sequence at the same frequencies as the power peaks 56, 58, 60, 62, see FIG. 2. The peak values of the power peaks 76, 78 and 80 are in this case considerably lower than the peak values of the power peaks 56, 58 and 60, respectively. In the event of discrepancies from the optimum operating point, further power peaks 84, 86, 88 and 90 occur at the drive frequency and between the power peaks 76, 78, 80 and 82. The power peak 84 has a peak value of approximately 0.03, which is below the peak value of 0.25 at the power peak 76. The peak values of the power peaks 86, 88 and 90 are in each case approximately between the peak values of the respectively adjacent power peaks 76, 78, 80 and 82.

The change between the power density spectrum 50 and the power density spectrum 70, which can be seen in FIGS. 2 and 3 when there are any discrepancies from the operating point can be utilized to control the operating point of the pulse modulator. The occurrence of the power peak 84 at the drive frequency (i.e., at 5 Gigahertz) is used, in particular, to control the operating point. The aim is to minimize the peak value of this power peak. A frequency range FB1 surrounding the power peak 84 has a width of about 0.3·f, where f is the drive frequency. The frequency range FB1 is centered about the drive frequency f. If the operating point is controlled using radio-frequency components, only the power peak 84 is used within the frequency range FB1.

The power density spectrum of the output radiation is likewise used to control the operating range AB. FIG. 3 shows a frequency range FB2 surrounding the power peak 76, and containing the frequencies used to control the operating range. The frequency range FB2 has a width of about 0.3·2f, where f is the drive frequency. If there are any discrepancies between the operating range and the nominal operating range, this leads to a reduction in the peak value of the power peak 76 in the frequency range FB2.

Figure 4:
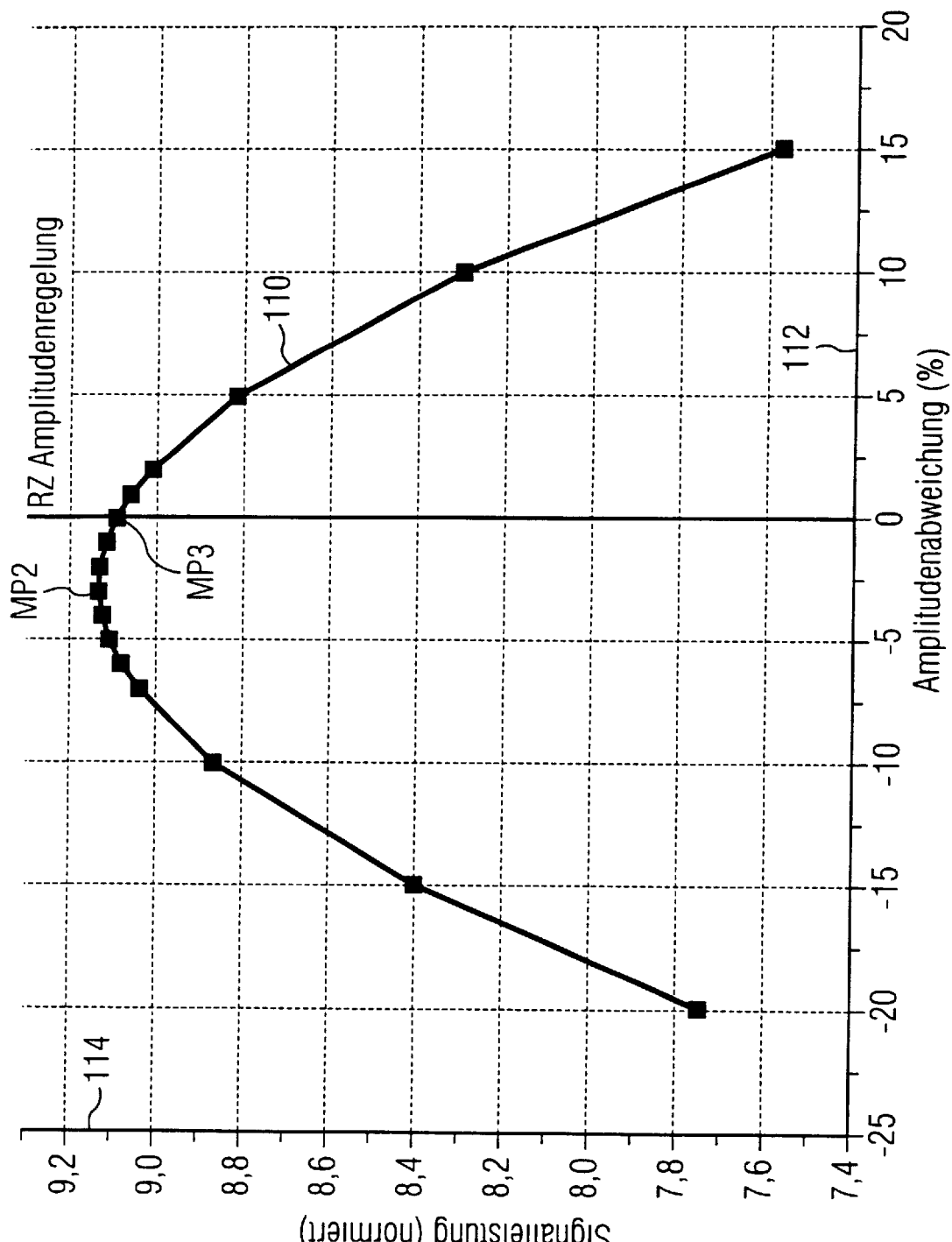
FIG. 4 shows the mean radio-frequency radiation power in a predetermined frequency range as a function of the operating range discrepancy between the actual operating range and the nominal operating range.

FIG. 4 shows a power function 110 of the mean radio-frequency radiation power in the frequency range FB2 as a function of the operating range discrepancy between the nominal operating range AB1 and the actual operating range, see FIG. 1. An abscissa axis 112 shows the discrepancy between the nominal operating range AB1 and the actual operating range AB as a percentage. This discrepancy is proportional to the discrepancy between the amplitude of the control signal and the nominal value. An ordinate axis 114 shows the normalized radiation power. The power function 110 has a maximum when there is a discrepancy of approximately 3 percent between the nominal operating range AB1 and the actual operating range. The power function 110 has a profile which is similar to an inverted parabola, so that the radiation power falls continuously to the left and right of a discrepancy of −3 percent. A measurement point MP3 to the right alongside the measurement point MP2 is associated with an amplitude discrepancy of 0 percent. The aim of the operating range control must therefore be to achieve a radiation power associated with measurement point MP3. This may be done using a control loop which maximizes the radiation power which is, however, tuned such that it is controlled to the measurement point MP3. A circuit for such a control loop is explained below, with reference to FIG. 5.

Figure 5:
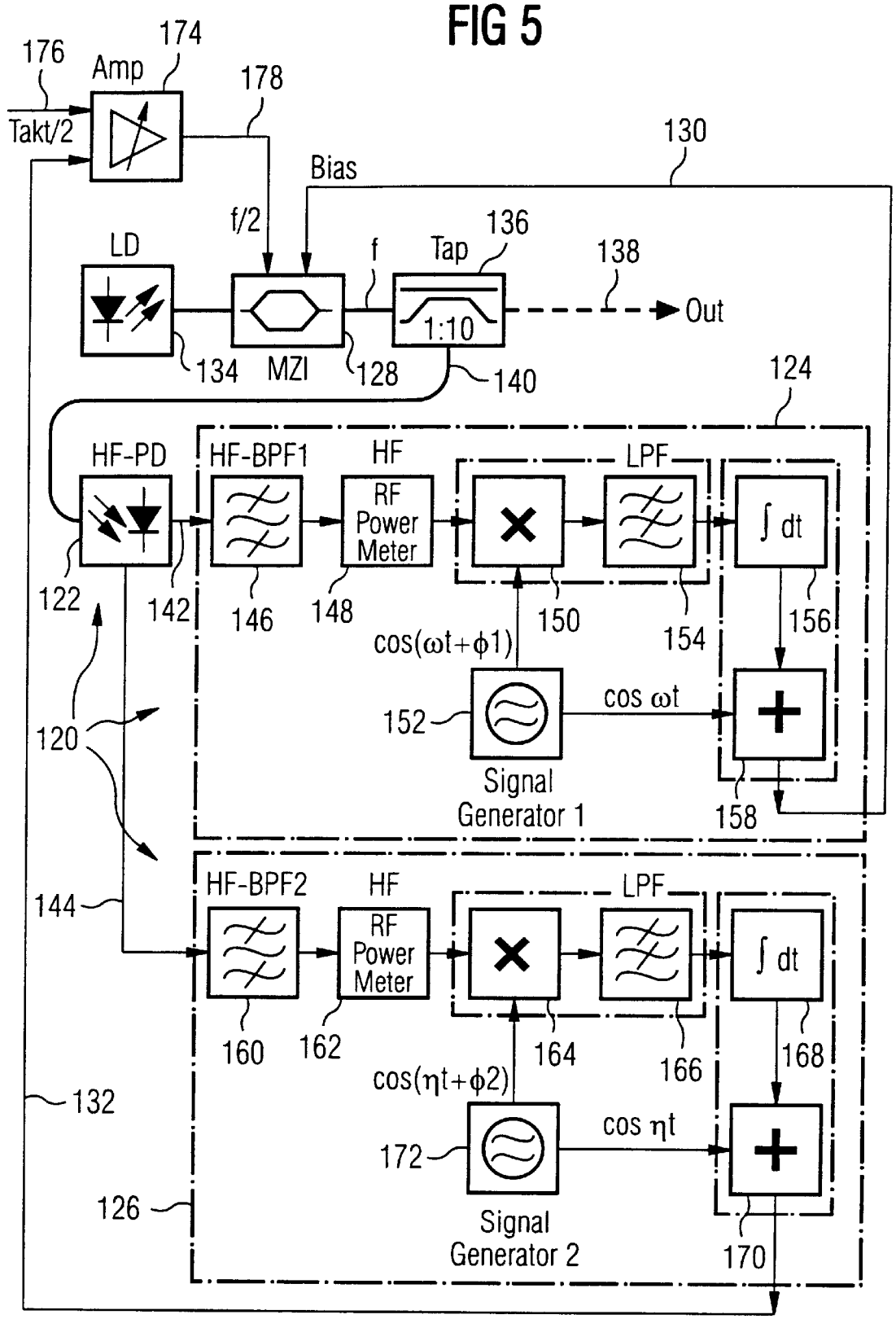
FIG. 5 shows a block diagram of an exemplary embodiment of a drive unit containing radio-frequency components in accordance with the principles of the present invention.

FIG. 5 shows a block diagram for a drive unit 120 which contains radio-frequency components, and contains a photodiode 122, an operating point control circuit 124 and an operating range control circuit 126. The drive unit 120 is used for driving a pulse modulator 128, which contains what is referred to as a Mach-Zehnder interferometer (MZI) and has a transmission characteristic 10, see FIG. 1. The modulator 128 modulates the radiation produced by a laser diode 134, as a function of an operating point control voltage 130 produced by the operating point control circuit 124, and as a function of an operating range control voltage 132 produced by the operating range control circuit 126. The laser diode 134 operates in the continuous wave mode, so that the input radiation to the modulator 128 has a constant radiation power.

The modulated output voltage is split in a radiation splitter 136 in a ratio of about 1:10. The majority of the modulated radiation is supplied to a data modulator, which is not illustrated but which modulates the output radiation in accordance with the data to be transmitted, see the arrow 138. The smaller portion of the output radiation is transmitted from the radiation splitter 136 via an optical waveguide 140 to the photodiode 122.

The photodiode 120 has a cut-off frequency in the Gigahertz range, and is thus a radio-frequency diode. The current flowing through the photodiode 122 depends on the radiation striking the photodiode 122. The current signal, which is dependent on the radiation, or a voltage signal obtained from it, is used as the input signal to the operating point control circuit 124 and as the input signal to the operating range control circuit 126, see the arrows 142 and 144.

The operating point control circuit 124 contains a radio-frequency bandpass filter 146, to whose input a signal coming from the photodiode 122 is applied. The bandpass filter 146 essentially transmits only signals at frequencies which are within the frequency range FB1. Signals at frequencies which are outside the frequency range FB1 are highly attenuated. The bandpass filter 146 is followed by a radio-frequency power meter 148. The power meter 148 contains a rectifier diode with a cut-off frequency in the radio-frequency range. A signal whose value depends on the radiation power within the frequency range FB1 is emitted at the output of the power meter 148. This signal is not applied in a multiplication unit 150 by a reference signal which is produced by a signal generator 152. The voltage $u_r(t)$ of the reference signal is given by:

$$u_r(t) = \underline{u}_r \cdot \cos(\omega t + \Phi 1) \quad (1)$$

where $u_r(t)$ is the instantaneous value of the voltage of the reference signal as a function of time t, $\underline{u}_r$ is the maximum value of the voltage of the reference signal, $\omega$ is a reference circular frequency, and $\Phi 1$ is an adjustable phase. The reference circular frequency $\omega$ is $2\pi$ times the deflection frequency of the operating point.

The voltage $u_i$ of the input signal emitted from the power meter 148 to the multiplication unit 150 can be described by the following formula:

$$u_i(t) = f(x_0 + \underline{u}0 \cdot \cos(\omega \cdot t)) \quad (2),$$

where $u_i$ is the instantaneous value of the input signal, $\underline{u}0$ is the maximum value of the forced deflection about the actual operating point $x_0$, $\omega$ is the reference frequency and $f(\ldots)$ is a function to describe the relationship between the operating point and the mean detected radiation power.

The multiplication unit 150 produces an output signal which, in addition to components with multiples of the reference frequency $\omega$, also contains a DC component. The DC component is a measure of the derivative of the function illustrated in FIG. 4, is filtered out via a low-pass filter 154, and is transmitted to an integration unit 156. Signal components at the reference frequency $\omega$ and signal components at a frequency which corresponds to a multiple of the reference frequency $\omega$ are highly attenuated by the low-pass filter 154 and are thus not passed to the integration unit 156. The integration unit 156 integrates the signal applied to its input over time, and thus supplies the integration component of the control system. On the output side, the integration unit 156 is connected to a first input of an addition element 158. The other input of the addition element 158 is connected to an output of the signal generator 152, at which a deflection signal is produced whose value varies in accordance with a cosine function with the reference frequency $\omega$. The output of the addition element 158 also forms the output of the operating range control circuit 124.

Adjustment of the phase $\Phi 1$ allows the operating point control circuit 124 to drive the pulse modulator 128 such that the radiation power within the filter range FB1 is minimized, and the actual operating point is thus controlled to the transmission maximum of the nominal operating point. The reference frequency $\omega$ is selected as appropriate and is, for example, in the kilohertz range.

The operating range control circuit 126 is essentially constructed in the same way, and hence also operates in the same way, as the operating point control circuit 124. The operating range control circuit 126 thus contains, in the sequence from the input to the output, a bandpass filter 160, a power meter 162, a multiplication unit 164, a low-pass filter 166, an integration unit 168 and an addition element 170. The bandpass filter 160 transmits only signals at a frequency which is within the frequency range FB2. The operating range control circuit 126 also contains a signal generator 172, which produces a reference signal which varies in accordance with the function $\cos(\eta + \phi 2)$, where $\eta$ is a reference circular frequency that is not the same as the reference circular frequency $\omega$. The reference circular frequency $\eta$ is $2\omega$ times the deflection frequency of the operating range. $\phi 2$ is an adjustable signal phase. Furthermore, the signal generator produces a further deflection signal, which varies in accordance with the function $\cos \upsilon t$. This deflection signal is applied to the other input of the addition element 170.

The output of the addition element 170 is also output of the operating range control circuit 126, which produces the operating range control voltage 132. This control voltage 132 is used to adjust the gain of an amplifier 174. An input signal 176 with a sinusoidal waveform and at half the drive frequency is applied to the input of the amplifier 174. An output signal 178 from the amplifier 174 matches the control signal 20, except for the mean value, and is used to drive the pulse modulator 128.

The amplifier 174 also has an output, which is not illustrated, at which a voltage that is proportional to the output power of the amplifier is emitted. This voltage is used for tuning the operating range control circuit 128 by using a subtraction element, which is not illustrated, between the low-pass filter 166 and the integration element 168 to subtract the voltage from the signal within the control loop, see also FIG. 9.

By suitable choice of the phase $\phi 2$, it is possible for the operating range control circuit 126 to control the radiation power within the frequency range FB2 to the value represented by the measurement point MP3 in FIG. 5. At the same time, the amplitude of the control signal 20 is thus controlled such that the actual operating range matches the nominal operating range AB1.

By suitable choice of the reference frequencies ω and υ, it is possible for the operating point to be controlled independently of the operating range control, and for the operating range control to operate independently of the operating point control. Suitable values are, for example, 3 kHz and 5 kHz, respectively, for the reference frequency ω and for the reference frequency υ.

Figure 6:
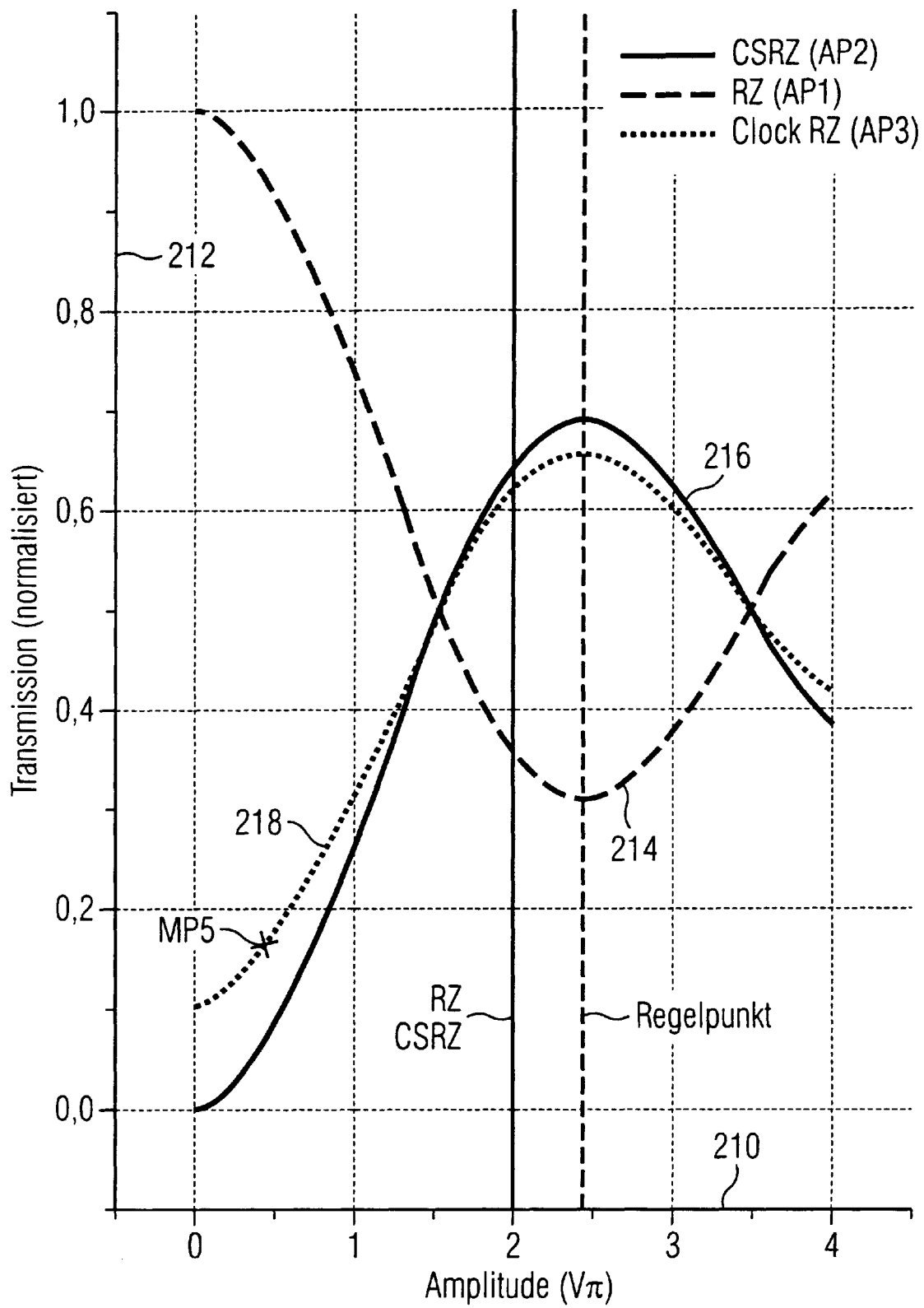
FIG. 6 shows the mean low-frequency radiation power as a function of the operating range discrepancy.

FIG. 6 shows the mean low-frequency radiation power as a function of the operating range discrepancy for three modulator operating modes. The mean low-frequency radiation power covers, for example, frequencies from 0 Hz to 10 Hz.

An abscissa axis 210 shows the amplitude of the control signal. The unit Vπ is once again used as the unit, with an operating range of 2 Vπ being the nominal operating range for RZ operation and for CSRZ operation, and including a range of 360° or 2 π radians on the transmission characteristic 10. The power transmitted by the modulator in the low-frequency range is plotted, in normalized form, on an ordinate axis 212.

An RZ characteristic 214 applies to an operating point at the transmission maximum on the characteristic 10, for example, to the operating point AP1. The characteristic 214 has a transmission minimum at an operating range of about 1.22•2 Vπ, and this is suitable for controlling the operating range and the amplitude. The control loop can be tuned so that the nominal operating range is located to the left alongside the transmission maximum, at the amplitude 2 Vπ.

A CSRZ characteristic 216 applies to an operating mode in which the nominal operating point is at a transmission minimum on the transmission characteristic 10, for example, at the operating point AP2. The characteristic 216 has a transmission maximum at about 1.22•2 Vπ, which is suitable for controlling the operating range. The control loop can be tuned so that the operating range once again has a width of 2 Vπ.

A characteristic 218 relates to clock RZ operation, in which the nominal operating point is between the transmission maximum and the transmission minimum on the transmission characteristic 10, for example, at the operating point AP3, see FIG. 1. The characteristic 218 has a transmission maximum for an operating range of about 1.22•2 Vπ, and has a transmission minimum for about 0 Vπ, both of which are suitable for controlling the operating range via a control loop. The control loop can be tuned such that the nominal operating range is, for example, considerably less than Vπ, see the measurement point MP5 at 0.4 Vπ.

Circuits with control loops for controlling the operating range in each of one of three operating modes of the modulator will be explained below with reference to FIG. 7.

FIG. 7 shows a block diagram for a drive unit 220, which operates at low frequency, in a pulse modulator 128b, which likewise has a transmission characteristic 10, see FIG. 1. The major difference between the drive unit 220 and the drive unit 120, see FIG. 6, is that the drive unit 120 contains radio-frequency components. Otherwise, the construction of the drive units 120 and 220 is identical, so that circuit modules with the same construction and the same function have the same reference symbols. However, the reference symbols have the suffix b in order to distinguish between them. This applies in particular to the reference symbols 124b to 140b. Instead of the radio-frequency photodiode 122, the drive unit 220 uses a photodiode 220 which has a cut-off frequency in the low-frequency range, for example a cut-off frequency of 10 kHz. The deflection frequency is within the bandwidth of the photodiode 220. The current flowing through the low-frequency photodiode 222 varies as a function of the output radiation striking the photodiode 220. Only the low-frequency components of the output radiation result in a variation in the diode current. The photodiode 222 also averages over the frequency range above its cut-off frequency. The diode current, or a voltage derived from it, is used as the input variable to the operating point control circuit 124b, and as the input variable to the operating range control circuit 126b, see the arrows 224 and 226.

The operating point control circuit 124b contains, from its input to its output, a multiplication unit 150b, a low-pass filter 154b, an integration unit 156b, and an addition element 158b. Furthermore, the control circuit 124 contains a signal generator 152b, which produces a reference signal and a deflection signal. The reference signal varies in accordance with the function cos (ωt+φ3). The deflection signal varies in accordance with the function cos (ωt).

The operating range control circuit 126b contains, from the input to the output, a multiplication unit 164b, a low-pass filter 166b, a subtraction element 228, an integration element 168b and an addition element 170b. In addition, the control circuit 126b contains a signal generator 172b, which produces a reference signal and a deflection signal. The reference signal varies in accordance with the function cos (υt+φ4). The deflection signal varies in accordance with the function cos (υt). The output of the operating range control circuit 126b is connected to the control input of an amplifier 174b. An input signal 176b which has a sinusoidal waveform at the drive frequency is applied to the amplifier 174b. An output signal 178b is used to drive the modulator 128b and, except for the mean value, matches the control signal 20, see FIG. 1. Furthermore, the amplifier 174b produces a tuning signal 230, whose signal value varies as a function of the mean output power from the amplifier 174b. The tuning signal 230 is applied to a further input of the subtraction element 228, and is used to tune the control circuit 126b in order to control the operating range.

If the modulator 128b is operated at the operating point AP1, see FIG. 1, then the phase φ3 is set such that the operating point control circuit 124b controls the emitted power to a minimum. This results in the operating point being controlled to the transmission maximum. The phase φ4 is thus chosen such that the operating range control circuit 126b controls the power of the output radiation in the low-frequency cut-off region on the basis of tuning to a control point, which is shown in addition to that in FIG. 6, with minimum transmission. Thus, the amplitude of the control signal is regulated to the value 2 Vπ.

The deflection frequencies ω and υ differ from one another, and are, for example, 3 kHz and 5 kHz, respectively.

In yet another embodiment, the modulator 128b is operated at the operating point AP2, that is to say at the transmission minimum. The phase φ3 of the operating point control circuit 124b is set such that the output radiation transmitted by the modulator 128b in the low-frequency range assumes a maximum value. The phase φ4 is chosen such that, although the output radiation from the modulator 128 is maximized, the tuning when the control loop is in the steady state is somewhat away from the maximum, see FIG. 6, characteristic 216.

If, in another embodiment, the modulator 128b is operated at the operating point AP3, see FIG. 1, then the phase φ3 is set such that the operating point control circuit 124b minimizes the power in the low-frequency range of the output radiation from the modulator 128b and, owing to the tuning, controls it at a value which is somewhat offset from the minimum. The operating point is thus also controlled at the nominal operating point AP3. The phase φ4 in the operating point AP3 operating mode is chosen such that the operating range control circuit 126b likewise minimizes the mean power of the output radiation from the modulator 128b in the low-frequency range. However, via the tuning of the control circuit 126b, the operating range is controlled at a considerably lower value than 2 Vπ.

In another embodiment, the modulator 128b is a data modulator, which is driven by an input signal 176b or output signal 178b dependent on data.

The operating point is somewhat offset from the point of inflection of the transmission characteristic. The operating range is somewhat less than 1 Vπ. The input radiation is produced by the laser diode 134b, which is operated in the continuous wave mode. The operating point control circuit controls at a minimum, and is tuned. The operating range control circuit likewise controls at a minimum, and is also tuned.

In a further embodiment for a data modulator, a pulse modulator is used instead of the laser diode, for example the pulse modulator, including the control units, shown in FIG. 7.

Although the present invention has been described with reference to specific embodiments, those of skill in the art will recognize that changes may be made thereto without departing from the spirit and scope of the invention as set forth in the hereafter appended claims.

What is claimed is:

1. A method for controlling an operating range of a modulator, wherein the modulator produces modulated output radiation from input radiation as a function of a control signal, and the actual operating range of the modulator with respect to its transmission characteristic depends on an amplitude of the control signal, the method comprising the steps of:

detecting the mean radiation power of the output radiation in at least one predetermined frequency range;

forcing cyclic deflection of the operating range to occur at a deflection frequency;

producing a control signal for controlling the operating range as a function of the deflection of the operating range; and varying the amplitude of the control signal as a function of the control signal.

2. A method for controlling an operating range of a modulator as claimed in claim 1, the method further comprising the steps of:

using a derivative of the function of the operating range and of the detected power as a control variable; and referring to a point in the function at which the derivative has the value zero.

3. A method for controlling an operating range of a modulator as claimed in claim 1, wherein the modulator is one of a pulse modulator which is driven by a cyclic control signal at a predetermined drive frequency and a data modulator which is driven by a control signal which is dependent on the data to be transmitted, the drive frequency being half the data rate.

4. A method for controlling an operating range of a modulator as claimed in claim 1, wherein the frequency range which is predetermined for controlling the operating range essentially includes all the frequencies which can be detected by a transducer unit for detecting the output radiation.

5. A method for controlling an operating range of a modulator as claimed in claim 3, wherein the frequency range which is predetermined for controlling the operating range includes only a portion of the frequencies of the output radiation detected by a transducer unit.

6. A method for controlling an operating range of a modulator as claimed in claim 5, wherein the frequency range includes approximately twice the drive frequency, does not include other multiples of the drive frequency nor the drive frequency itself, and has a width of approximately 0.3 times twice the drive frequency.

7. A method for controlling an operating range of a modulator as claimed in claim 6, wherein a nominal operating range of the modulator is symmetrical about one of a transmission maximum and a transmission minimum of the transmission characteristic, and the amplitude value of the control signal is controlled via a control loop, which is aligned without being tuned to a control point at which the mean power is a maximum within the frequency range predetermined for controlling the operating range.

8. A method for controlling an operating range of a modulator as claimed in claim 3, wherein the frequency range which is predetermined for controlling the operating range includes only frequencies which are well below the drive frequency.

9. A method for controlling an operating range of a modulator as claimed in claim 8, wherein a nominal operating range of the modulator is symmetrical about one of a transmission minimum of the transmission characteristic and an operating point between a transmission point of inflection and a transmission maximum of the transmission characteristic, and the amplitude value of the control signal is controlled via a control loop, which is aligned, without being tuned, to a control point at which the mean radiation power is a maximum within the frequency range predetermined for controlling the operating range.

10. A method for controlling an operating range of a modulator as claimed in claim 8, wherein a nominal operating range of the modulator is symmetrical about one of a transmission maximum and an operating point in the transmission characteristic between a transmission minimum and a transmission point of inflection, and in that the amplitude value of the control signal is controlled via a control loop, which is aligned, without being tuned, to a control point at which the mean radiation power is a minimum within the frequency range predetermined for controlling the operating range.

11. A method for controlling an operating range of a modulator as claimed in claim 9, wherein the control loop is tuned such that the control loop is controlled to a point close to the control point, in the nominal operating range of the modulator.

12. A method for controlling an operating range of a modulator as claimed in claim 1, wherein the amplitude of the control signal is varied by varying one of a gain of an amplifier which is used to produce the control signal and a controllable attenuator.

13. A method for controlling an operating range of a modulator as claimed in claim 1, the method using phase-sensitive detection for control, the method further comprising the steps of:

superimpsoing on the control signal, additively or subtractively, a deflection signal at the deflection frequency;

multiplying a signal which is dependent on the detected power by a cyclic reference signal whose frequency matches one of the deflection frequency and a multiple of the deflection frequency; and varying the amplitude of the control signal using a signal resulting from the multiplying step, after low-pass filtering and subsequent integration.

14. A method for controlling an operating range of a modulator as claimed in claim 1, wherein the input radiation is produced using one of a continuous wave radiation source and a pulsed radiation source.

15. A drive unit for controlling the operating range of a modulator, the unit comprising:
- a transducer unit which produces an output signal as a function of the output radiation from a modulator, with a signal value of the output signal being a measure of radiation power;
- an operating range deflection unit for cyclic deflection of the operating range at a deflection frequency;
- an operating range control unit for producing a control signal for controlling the operating range as a function of the output signal from the transducer unit and as a function of the deflection of the operating range; and
- an adjustment unit for varying the amplitude value of a control signal for the modulator as a function of the control signal.

16. A drive unit for controlling the operating range of a modulator as claimed in claim 15, the unit further comrpising a bandpass filter arranged between the transducer unit and the control unit, the bandpass filter passing only signals at frequencies which approximate twice a drive frequency.

17. A drive unit for controlling the operating range of a modulator as claimed in claim 15, wherein the transducer unit contains a photo element which detects only light at frequencies which are below one-tenth of a drive frequency.

18. A drive unit for controlling the operating range of a modulator as claimed in claim 17, the unit further comprising:
- a low-frequency signal generator for producing an alternating signal;
- a multiplication unit connected downstream from the signal generator and whose other input is connected downstream from one of the photo element and a power meter, the power meter connected downstream from the bandpass filter;
- a low-pass filter unit connected downstream from the multiplication unit, the low pass-filter unit passing only signals at a frequency which is less than the frequency of the alternating signal;
- an integration unit connected downstream from the low-pass filter unit, the integration unit producing, at its output, a signal that is proportional to the time integral of the signal at its input; and
- an addition unit connected downstream from the integration unit and the signal generator, the addition unitr adding the signal values applied to its inputs.

19. A drive unit for controlling the operating range of a modulator as claimed in claim 18, the unit further comprising a subtraction unit connected downstream from the low-pass filter unit, the subtraction unit subtracting the signal values at its inputs, the subtraction unit being supplied with a signal which is proportional to a mean value of the control signal, and the integration unit being connected downstream from the subtraction unit.

* * * * *